United States Patent
Lu et al.

(10) Patent No.: US 9,565,244 B2
(45) Date of Patent: Feb. 7, 2017

(54) METHODS AND APPARATUS FOR OPERATING BROWSER ENGINE

(71) Applicant: TENCENT TECHNOLOGY (SHENZHEN) COMPANY LIMITED, Shenzhen (CN)

(72) Inventors: Yang Lu, Shenzhen (CN); Mengliang Rao, Shenzhen (CN); Fanchao Liu, Shenzhen (CN); Xinhua Guo, Shenzhen (CN); Jingyao Wang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 526 days.

(21) Appl. No.: 14/100,074

(22) Filed: Dec. 9, 2013

(65) Prior Publication Data
US 2014/0095575 A1    Apr. 3, 2014

Related U.S. Application Data

(63) Continuation of application No. PCT/CN2013/083016, filed on Sep. 5, 2013.

(30) Foreign Application Priority Data

Sep. 7, 2012  (CN) .......................... 2012 1 0329720

(51) Int. Cl.
*G06F 15/16*   (2006.01)
*H04L 29/08*   (2006.01)
*G06F 17/30*   (2006.01)

(52) U.S. Cl.
CPC ......... *H04L 67/10* (2013.01); *G06F 17/30873* (2013.01)

(58) Field of Classification Search
CPC ....................................................... H04L 67/10
(Continued)

(56) References Cited

U.S. PATENT DOCUMENTS

| 5,802,304 A | 9/1998 | Stone |
| 2007/0078947 A1 | 4/2007 | Lakhdhir |

(Continued)

FOREIGN PATENT DOCUMENTS

| CN | 1419192 A | 5/2003 |
| CN | 1513137 A | 7/2004 |

(Continued)

OTHER PUBLICATIONS

Taiwan Intellectual Property Office (TIPO) Office Action 1 for 102130948 Jan. 12, 2015.
(Continued)

*Primary Examiner* — Karen Tang
(74) *Attorney, Agent, or Firm* — Anova Law Group, PLLC (57) ABSTRACT

Various embodiments provide methods and apparatus for operating a browser engine, and related browsers and terminals. When starting a browser, an operating environment of the browser can be obtained. The operating environment can include a CPU environment in a browser-installed-terminal. A matched operation mode of the browser engine can be selected according to the operating environment. The selected operation mode can be used to operate the browser engine. Exemplary apparatus for operating the browser engine can include an obtaining module, a selection module, and an operation module. Various embodiments also provide a browser including the disclosed apparatus, and a terminal including the disclosed browser.

11 Claims, 5 Drawing Sheets

(58) Field of Classification Search
USPC .................................................. 709/231, 232
See application file for complete search history.

(56) References Cited

U.S. PATENT DOCUMENTS

| | | |
|---|---|---|
| 2008/0263010 A1 | 10/2008 | Roychoudhuri et al. |
| 2009/0282327 A1 | 11/2009 | Hamilton, II et al. |
| 2012/0159460 A1* | 6/2012 | Haug ................ G06F 9/45516 717/139 |
| 2012/0272132 A1* | 10/2012 | Mondal ............. G06F 17/30899 715/234 |
| 2012/0331307 A1* | 12/2012 | Fernandez Gutierrez ................ G06F 21/72 713/190 |
| 2013/0024811 A1* | 1/2013 | Gleadall ............... G06F 3/0482 715/810 |
| 2013/0031536 A1* | 1/2013 | De ........................ G06F 9/4552 717/146 |
| 2013/0067441 A1* | 3/2013 | Lafreniere ................ G06F 8/41 717/139 |
| 2013/0205282 A1* | 8/2013 | Lafreniere .......... G06F 9/45504 717/139 |
| 2014/0096235 A1* | 4/2014 | Fryman ................... G06F 12/14 726/17 |
| 2014/0181591 A1* | 6/2014 | Bijanki ............... G06F 11/3684 714/38.1 |
| 2014/0208309 A1* | 7/2014 | Wu ..................... G06F 9/44505 717/174 |
| 2014/0366007 A1* | 12/2014 | Koltachev ................ G06F 8/53 717/129 |
| 2016/0062954 A1* | 3/2016 | Ruff ....................... G06F 17/21 715/249 |

FOREIGN PATENT DOCUMENTS

| | | |
|---|---|---|
| CN | 101231597 A | 7/2008 |
| CN | 102024048 A | 4/2011 |
| CN | 102156709 A | 8/2011 |
| TW | 201007563 A1 | 2/2010 |

OTHER PUBLICATIONS

Taiwan Intellectual Property Office (TIPO) Office Action 2 for 102130948 Apr. 14, 2015.
The State Intellectual Property Office of the People's Republic of China (SIPO) Office Action 1 for 201210329720.3 Feb. 28, 2015.
The State Intellectual Property Office of the People's Republic of China (SIPO) Office Action 2 for 201210329720.3 Aug. 31, 2015.
The World Intellectual Property Organization (WIPO) International Search Report for PCT/CN2013/083016 Dec. 12, 2013.
Patent Office of the Russian Federation (Rospatent) Office Action 2 for 2014133353/08(053737) Apr. 22, 2016 pp. 1-10.

\* cited by examiner

METHODS AND APPARATUS FOR OPERATING BROWSER ENGINE

CROSS-REFERENCES TO RELATED APPLICATIONS

This application is a continuation application of PCT Patent Application No. PCT/CN2013/083016, filed on Sep. 5, 2013, which claims priority to Chinese Patent Application No. CN201210329720.3, filed on Sep. 7, 2012, the entire contents of all of which are incorporated herein by reference.

FIELD OF THE DISCLOSURE

The present disclosure relates to the field of network technology and, more particularly, relates to methods and apparatus for operating a browser engine, and related browsers and terminals.

BACKGROUND

A browser engine is included in a browser kernel. In an operating process, the browser engine is used to execute program code to handle web content, organize information, and calculate methods for displaying the web page, and then to output the web page in a browser. Typically, while compiling, the browser configures an operation mode of the browser engine. When compiled, the operation mode of the browser engine is also uniquely determined. The browser engine uses the configured operation mode to execute the program code. Thus, existing browser engines use the already-configured and uniquely-fixed operation mode to operate, which cannot be selected according to the operating environment of the browser.

This limits the terminal type suitable for the browser. For example, some terminals may have CPU (i.e., central processing unit) environment matched with the operation mode of the browser engine. The browser can then be operated in this terminal. In some cases, the terminal CPU environment does not match with the operation mode of the browser engine. The operating speed of the browser may be affected or the browser may be crashed, thereby affecting use flexibilities of the browser.

BRIEF SUMMARY OF THE DISCLOSURE

According to various embodiments, there is provided a method for operating a browser engine. An operating environment of a browser can be obtained when starting the browser. The operating environment can include a CPU environment in a browser-installed-terminal. A matched operation mode of the browser engine can be selected according to the operating environment. The selected operation mode can be used to operate the browser engine.

According to various embodiments, there is also provided an apparatus for operating a browser engine. The apparatus can include an obtaining module, a selection module, and an operation module. The obtaining module can be configured to obtain an operating environment of a browser when starting the browser. The operating environment can include a CPU environment in a browser-installed-terminal. The selection module can be configured to select a matched operation mode of the browser engine according to the operating environment. The operation module can be configured to use the selected operation mode to operate the browser engine.

Various embodiments further include a browser including the disclosed apparatus, and a terminal including the disclosed browser.

Other aspects or embodiments of the present disclosure can be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the present disclosure.

DETAILED DESCRIPTION

Reference will now be made in detail to exemplary embodiments of the disclosure, which are illustrated in the accompanying drawings. Wherever possible, the same reference numbers will be used throughout the drawings to refer to the same or like parts.

FIGS. 1-8 depict exemplary methods and apparatus for operating a browser engine in accordance with various disclosed embodiments. The exemplary methods and apparatus can be implemented, for example, in an exemplary environment 900 as shown in FIG. 9.

Figure 9:
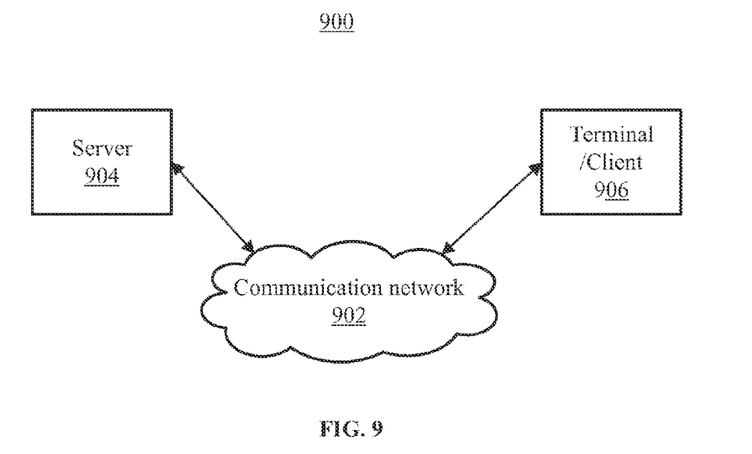
FIG. 9 depicts an exemplary environment incorporating certain disclosed embodiments.

As shown in FIG. 9, the environment 900 can include a server 904, a terminal 906, and a communication network 902. The server 904 and the terminal 906 may be coupled through the communication network 902 for information exchange, for example, Internet searching, webpage browsing, etc. Although only one terminal 906 and one server 904 are shown in the environment 900, any number of terminals 906 or servers 904 may be included, and other devices may also be included.

The communication network 902 may include any appropriate type of communication network for providing network connections to the server 904 and terminal 906 or among multiple servers 904 or terminals 906. For example, the communication network 902 may include the Internet or other types of computer networks or telecommunication networks, either wired or wireless.

A terminal, as used herein, may refer to any appropriate user terminal device with certain computing capabilities, for example, a personal computer (PC), a work station computer, a notebook computer, a car computer (e.g., carrying in a car or other vehicles), a server computer, a hand-held computing device (e.g., a tablet computer), a mobile terminal (e.g., a mobile phone, a smart phone, an iPad, and/or an aPad), a POS (i.e., point of sale) device, or any other user-side computing device. In various embodiments, the terms "terminal" and "terminal device" can be used interchangeably. In various embodiments, the terminal 906 can include one or more browsers installed therein and can be referred to as browser-installed terminal.

A server, as used herein, may refer one or more server computers configured to provide certain server functionalities, for example, search engines and database management. A server may also include one or more processors to execute computer programs in parallel.

Figure 10:
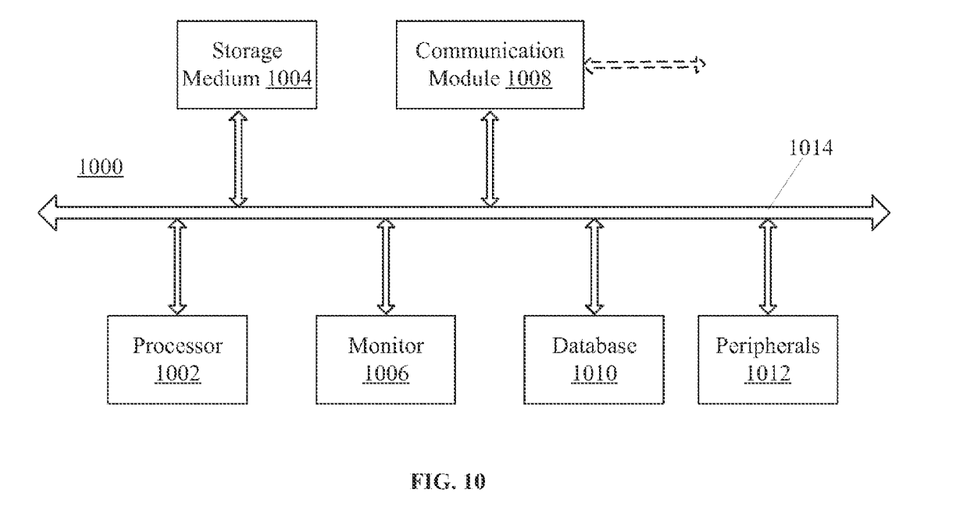
FIG. 10 depicts an exemplary server consistent with the disclosed embodiments.

The server 904 and the terminal 906 may be implemented on any appropriate computing platform. FIG. 10 shows a block diagram of an exemplary computing system 1000 capable of implementing the server 904 and/or the terminal 906. As shown in FIG. 10, the exemplary computer system 1000 may include a processor 1002, storage medium 1004, a monitor 1006, a communication module 1008, a database 1010, peripherals 1012, and one or more bus 1014 to couple the devices together. Certain devices may be omitted and other devices may be included.

The processor 1002 can include any appropriate processor or processors. Further, the processor 1002 can include multiple cores for multi-thread or parallel processing. The storage medium 1004 may include memory modules, for example, ROM, RAM, and flash memory modules, and mass storages, for example, CD-ROM, U-disk, removable hard disk, etc. The storage medium 1004 may store computer programs for implementing various processes, when executed by the processor 1002.

Further, the peripherals 1012 may include I/O devices, for example, keyboard and mouse, and the communication module 1008 may include network devices for establishing connections through the communication network 902. The database 1010 may include one or more databases for storing certain data and for performing certain operations on the stored data, for example, webpage browsing, database searching, etc.

In operation, the terminal 906 may cause the server 904 to perform certain actions, for example, an Internet search or other database operations. The server 904 may be configured to provide structures and functions for such actions and operations. More particularly, the server 904 may include a data searching system for real-time database searching. In various embodiments, a terminal, for example, a mobile terminal involved in the disclosed methods and systems can include the terminal 906.

As discussed above, exemplary terminal may include, for example, PCs (i.e., personal computer), tablet PCs, mobile phones, PDAs (i.e., personal digital assistant), e-readers, laptops, automotive terminals (e.g., terminals carried by motor vehicles) and/or other devices. In an exemplary embodiment, the browser can be a browser based on a webkit kernel, and the browser engine can be a JS (Java Script) engine. Exemplary JS browser engine can be a JSC (i.e., java script core, a kind of JavaScript engine) engine.

The JSC engine can be contained in the webkit kernel of the browser. The browser can be installed on a terminal. As used herein, unless otherwise specified, a terminal can be referred to as a terminal installed with one or more browsers, a terminal containing installed browser(s), or a browser-installed-terminal.

As used herein, an operating environment of a browser refers to a system environment of a browser-installed-terminal. The system environment can include, e.g., a CPU environment of the terminal. The CPU environment of a terminal (or terminal CPU environment) can include, e.g., types of instruction sets supported by the CPU in the terminal. The types of the instruction sets can include, e.g., a vfp (i.e., vector Hooting-point coprocessor for ARM) instruction set, a neon (i.e., an extended structure suitable for ARM processors) instruction set, a vfpv3 instruction set, a vfpv2 instruction set, a vfpv1 instruction set, a SSE (i.e., streaming SIMD extensions) instruction set, etc. The terminal CPU environment can also include, for example, types, quantities, frequencies, and other suitable parameters of a CPU that is used in the terminal.

In various embodiments, the operation mode of the browser engine can include, for example, a JIT (i.e., just-in-time) operation mode or an interpreter operation mode. The JIT operation mode includes, e.g., before executing the program code, translating the byte code to native machine code and operating the translated native machine code on the CPU. The interpreter operation mode includes, e.g., executing the program code in a manner to execute a line right after interpreting the line.

Figure 1:
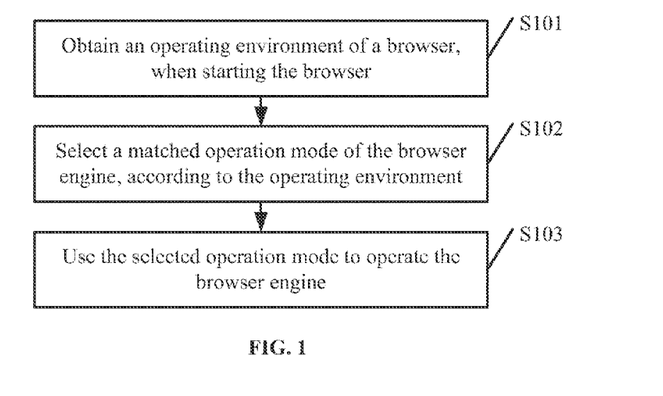
FIG. 1 depicts an exemplary method for operating a browser engine in accordance with various disclosed embodiments.

FIGS. 1-5 depict an exemplary method for operating a browser engine in accordance with various disclosed embodiments. For example, FIG. 1 depicts a flowchart illustrating an exemplary method for operating a browser engine. The exemplary operating method may include Steps S101-S103.

In Step S101, when starting a browser, an operating environment of a browser can be obtained. The operating environment can include a CPU environment in a browser-installed-terminal.

Configuration file(s) can be stored in a terminal (e.g., the browser-installed-terminal). In the configuration file(s), CPU environment parameters used in the host machine can be recorded. For example, for an Android mobile phone, types, frequencies, supported instruction sets, and/or other suitable CPU environmental parameters used by the Android mobile phone can be recorded in the /proc/cpuinfo file of the Android mobile phone. In this case, during a starting process of the browser, the recorded contents of the file can be read and the operating environment of the browser can be determined.

Figure 2:
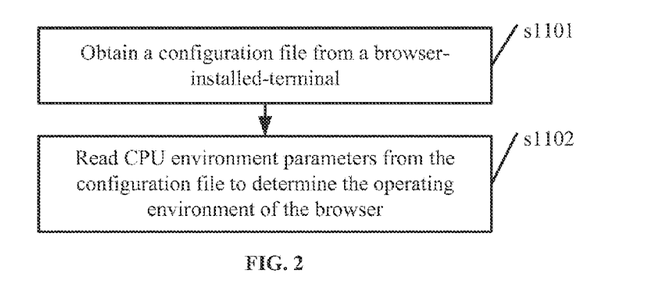
FIG. 2 depicts an exemplary method for performing Step S101 depicted in FIG. 1 in accordance with various disclosed embodiments.

FIG. 2 depicts a flow chart illustrating an exemplary method for performing Step S101 depicted in FIG. 1. For example, Step 101 can include Steps S1101 and S1103.

In Step S1101, a configuration file can be obtained from the browser-installed-terminal. When the configuration file is stored in the terminal, CPU environment parameters used by the host machine can be recorded in the configuration file. The recording of the CPU environment parameters can include reading the stored configuration files from the terminal during the startup process of the browser.

In Step S1102, the CPU environment parameters of the terminal can be read from the configuration file to determine an operating environment of the browser. The CPU environment parameters can include, e.g., types of the instruction sets supported by the CPU of the terminal.

Referring back to FIG. 1, in Step S102, according to the operating environment, a matched operation mode of the browser engine can be selected. In this case, according to the operating environment of the browser, the matched operation mode of the browser engine can be selected.

Figure 3:
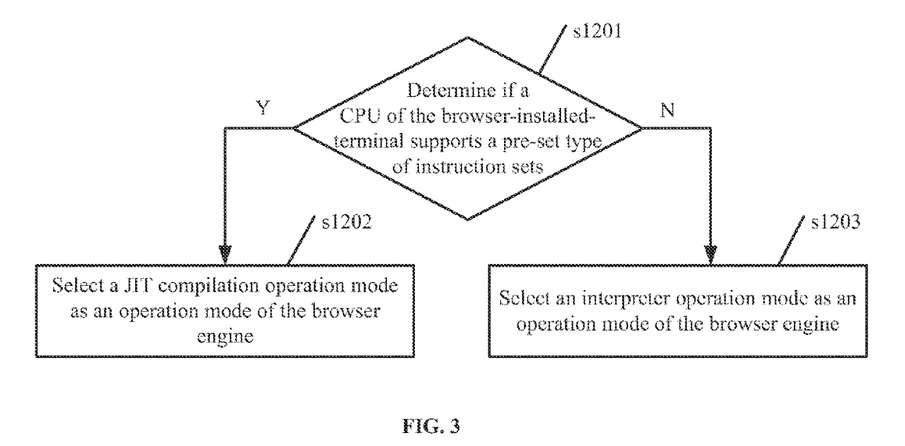
FIG. 3 depicts an exemplary method for performing Step 102 depicted in FIG. 1 in accordance with various disclosed embodiments.

FIG. 3 depicts a flow chart illustrating an exemplary method for performing Step S102 depicted in FIG. 1. For example, Step S102 can include Steps S1201 and S1203.

In Step S1201, it is determined whether the CPU of the browser-installed-terminal supports a pre-set type of instruction sets. When it is determined that the CPU of the browser-installed-terminal supports the pre-set type of instruction sets, the method can proceed to perform Step S1202. When it is determined that the CPU of the browser-installed-terminal does not support the pre-set type of the instruction sets, the method can proceed to perform Step S1203.

In Step S1202, a JIT (just-in-time) compilation operation mode (or a JIT operation mode) can be selected as an operation mode of the browser engine. In Step S1203, an interpreter operation mode can be selected as an operation mode of the browser engine.

In various embodiments, the pre-set type of the instruction set can be implemented as follows.

In one embodiment, the pre-set type of the instruction sets can include a vfp instruction set and a neon instruction set. That is, when the CPU supports the vfp instruction set while simultaneously supporting the neon instruction set, the JSC engine can be operated, for example, using a JIT operation mode, to ensure the operating speed of the browser. In some cases when the CPU does not simultaneously support the vfp instruction set and the neon instruction set, the JSC engine can be operated, for example, using the interpreter operation mode, to allow operation of the browser.

In another embodiment, the pre-set type of the instruction sets can include a vfpv3 instruction set. The CPU that supports the vfpv3 instruction set can be more rapidly and efficiently used to operate some standard media-computing tasks. For example, the CPU in a smart terminal (or intelligent terminal) with high configurations can support the vfpv3 instruction set, while the CPU in the common terminal with low configuration does not support the vfpv3 instruction set but can have low cost. When the JSC engine uses the JIT operation mode to run on a CPU that does not support the vfpv3 instruction set, an illegal instruction exception can be generated to cause crashing of the browser. When the JSC engine uses the interpreter operation mode to run on a CPU that supports the vfpv3 instruction set, operating speed of the browser can be affected. Therefore, when the CPU of the browser-installed-terminal supports the vfpv3 instruction set, the JSC engine can preferably use the JIT operation mode so as to ensure the operating speed of the browser. When the CPU of the browser-installed-terminal does not support the vfpv3 instruction set, the JSC engine can preferably use the interpreter operation mode to avoid crashing of the browser and ensure operation of the browser.

In Step S103, the browser engine can be operated using the selected operation mode. In this case, a pile function can be inserted into the JSC engine. When the JSC engine is in operation, the pile function in the JSC engine can modify the execution flow of the JSC engine to use the selected operation mode. The JSC engine can then use the selected operation mode to execute the program code to display page information in the browser.

Figure 4:
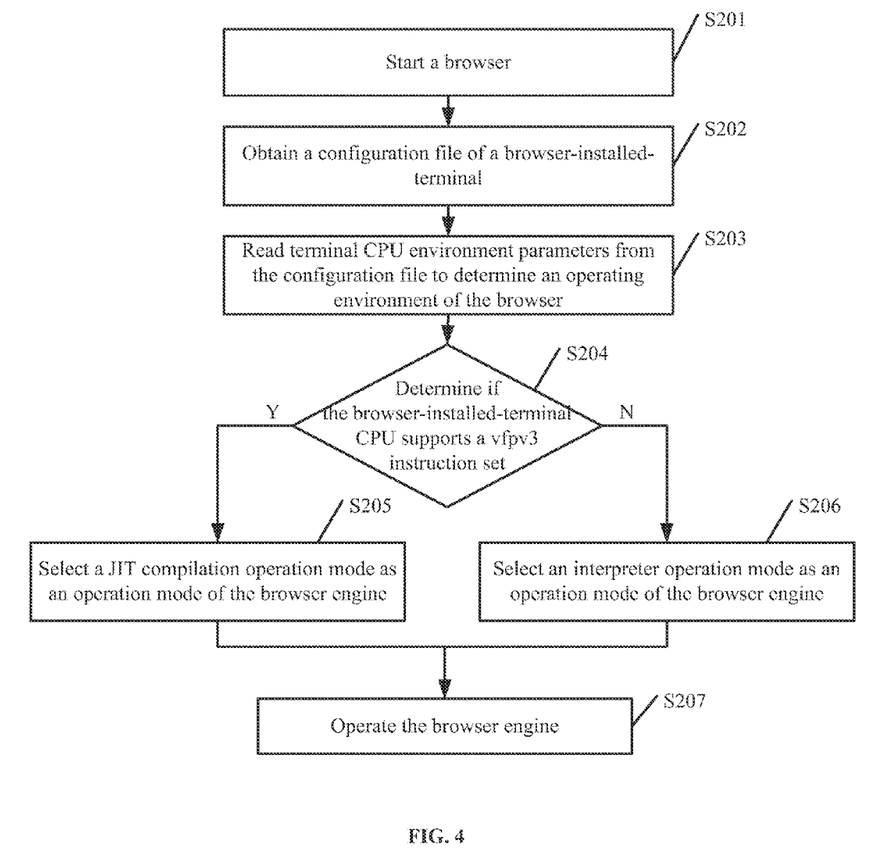
FIG. 4 depicts another exemplary method for operating a browser engine in accordance with various disclosed embodiments.

FIG. 4 depicts another exemplary method for operating a browser engine in accordance with various disclosed embodiments. The exemplary operating method can include Steps S201-S207.

In Step S201, a browser is started. In Step S202, a configuration file of a browser-installed-terminal is obtained. In Step S203, terminal CPU environment parameters can be read from the configuration file to determine an operating environment of the browser.

In Step S204, it is determined whether the browser-installed-terminal CPU supports a vfpv3 instruction set. When it is determined that the browser-installed-terminal CPU supports the vfpv3 instruction set, the method can proceed to perform Step S205. Otherwise, when it is determined that the browser-installed-terminal CPU does not support the vfpv3 instruction set, the method can proceed to perform Step S206.

When the JSC engine uses a JIT operation mode on a CPU that does not support vfpv3 instruction set, an illegal instruction exception can be generated that may cause crash of the browser. When the JSC engine uses an interpreter operation mode on a CPU that supports the vfpv3 instruction set, the operating speed of the browser can be affected. In this case, according to the CPU environmental parameters that are read, whether the browser-installed-terminal CPU supports the vfpv3 instruction set can be determined.

In Step S205, a JIT (just-in-time) compilation operation mode can be selected as an operation mode of the browser engine. In Step S206, an interpreter operation mode can be selected as an operation mode of the browser engine.

Therefore, when the CPU of a browser-installed-terminal supports the vfpv3 instruction set, the JSC engine can preferably use the JIT operation mode so as to ensure the operating speed of the browser. When the CPU of the browser-installed-terminal does not support the vfpv3 instruction set, the JSC engine can preferably use the interpreter operation mode to avoid crashing of the browser and ensure normal operation of the browser.

In Step S207, the browser engine is operated. In this case, when the JIT (just-in-time) operation mode is selected as an operation mode of the JSC engine, the browser engine can use the JIT operation mode to execute program code to display page information in the browser. When the interpreter operation mode is selected as an operation mode of the JSC engine, the browser engine can use the interpreter operation mode to execute program code to display page information in the browser.

Figure 5:
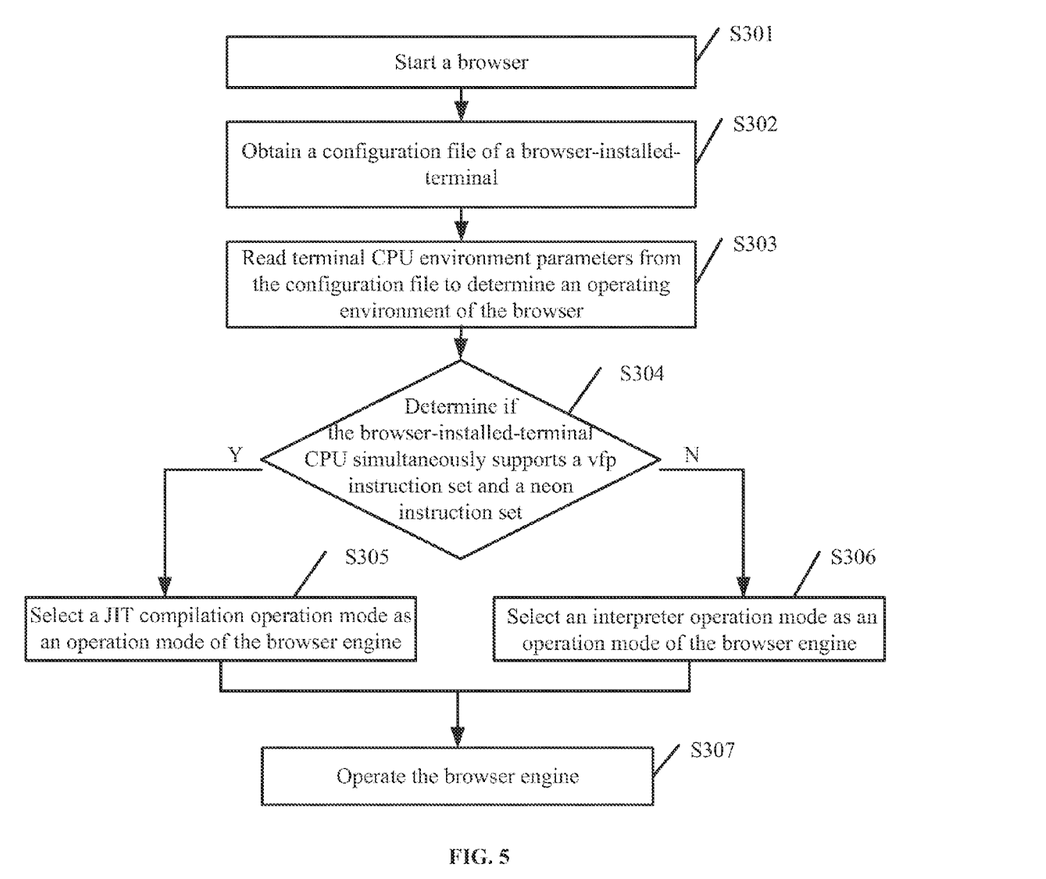
FIG. 5 depicts another exemplary method for operating a browser engine in accordance with various disclosed embodiments.

FIG. 5 depicts another exemplary method for operating a browser engine in accordance with various disclosed embodiments. The exemplary method can be performed by Steps S301-S307.

In Step S301, a browser is started. In Step S302, a configuration file of a browser-installed-terminal is obtained. In Step S303, terminal CPU environment parameters can be read from the configuration file to determine an operating environment of the browser.

In Step S304, it is determined whether the browser-installed-terminal CPU simultaneously supports a vfp instruction set and a neon instruction set. When it is determined that the browser-installed-terminal CPU simultaneously supports the vfp instruction set and the neon instruction set, the method can proceed to perform Step S305. Otherwise, when it is determined that the browser-installed-terminal CPU does not simultaneously support the vfp instruction set and the neon instruction set, the method can proceed to perform Step S306.

In Step S305, a JIT (just-in-time) compilation operation mode can be selected as an operation mode of the browser engine. Then the method can proceed to perform Step 307.

In Step S306, an interpreter operation mode can be selected as an operation mode of the browser engine. When the CPU of the browser-installed-terminal simultaneously supports the vfp instruction set and the neon instruction set, the JSC engine can preferably use the JIT operation mode to ensure the operating speed of the browser. When the CPU of the browser-installed-terminal does not simultaneously support the vfp instruction set and the neon instruction set, the JSC engine can preferably use the interpreter operation mode to ensure normal operation of the browser.

In Step S307, the browser engine is operated.

As disclosed herein, according to the operating environment (including, for example, CPU environment of the browser-installed-terminal), a matched operation mode can be selected to operate the browser engine. In this manner, the browser can be operated in an operating environment in various types of terminal, i.e., the browser can be used in various terminal types. The flexibility for using a browser can be improved.

Figure 6:
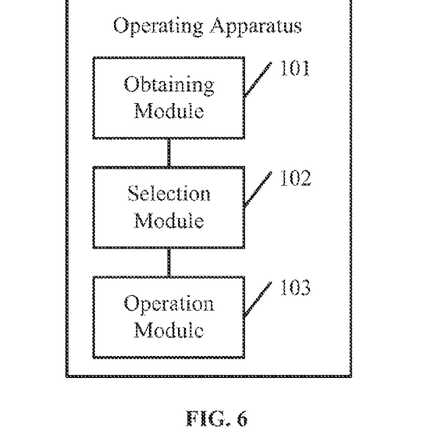
FIG. 6 depicts an exemplary apparatus for operating a browser engine in accordance with various disclosed embodiments.
Figure 7:
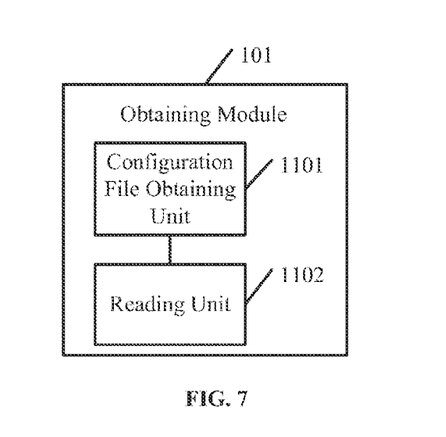
FIG. 7 depicts an exemplary obtaining module for an exemplary operating apparatus in accordance with various disclosed embodiments.
Figure 8:
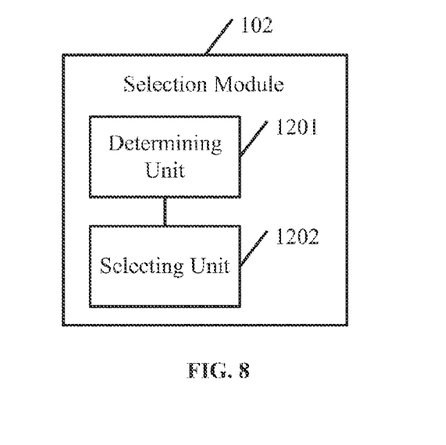
FIG. 8 depicts an exemplary selection module for an exemplary operating apparatus in accordance with various disclosed embodiments.

FIGS. 6-8 depict various exemplary operating apparatus for operating a browser engine in accordance with various disclosed embodiments. The operating apparatus can be, for example, browser engine itself, or configured in the browser but independent from the browser engine. Such exemplary apparatus can be used to perform various disclosed methods.

FIG. 6 depicts an operating apparatus for a browser engine in accordance with various disclosed embodiments. The exemplary operating apparatus can include an obtaining module 101, a selection module 102, and/or an operation module 103.

The obtaining module 101 can be configured, when starting the browser, to obtain an operating environment of the browser. The operating environment can include, e.g., CPU environment of the browser-installed-terminal.

Configuration file(s) can be stored in a terminal. In the configuration file(s), CPU environment parameters used in the host machine (e.g., the terminal) can be recorded. For example, for an Android mobile phone, types, frequencies, supported instruction sets, and/or other suitable CPU environmental parameters used by the Android mobile phone can be recorded in the /proc/cpuinfo file of the Android mobile phone. During a starting process of the browser, the obtaining module 101 can read the recorded contents of the file to determine the operating environment of the browser.

FIG. 7 depicts an exemplary obtaining module 101. In one embodiment, the exemplary obtaining module 101 can be configured in the apparatus as depicted in FIG. 6. Such exemplary obtaining module 101 can include a configuration file obtaining unit 1101 and/or a reading unit 1102.

The configuration file obtaining unit 1101 can be configured, when starting the browser, to obtain a configuration file of the browser-installed-terminal.

The reading unit 1102 can be configured to read CPU environment parameters of the terminal from the configuration file to determine the operating environment of the browser.

The selection module 102 is used to select a matched operation mode of the browser engine according to the operating environment. FIG. 8 depicts an exemplary selection module 102. In one embodiment, the exemplary selection module 102 can be configured in the apparatus as depicted in FIG. 6. Such exemplary selection module 102 can include a determining unit 1201 and/or a selecting unit 1202.

The determining unit 1201 can be used to determine whether the CPU of the browser-installed-terminal supports the pre-set type of instruction sets. The preset type of instruction sets can be a vfpv3 instruction set. Alternatively, the pre-set type of the instruction set can be a vfp instruction set and a neon instruction set.

The selecting unit 1202 is used to select a JIT compilation operation mode (or a JIT operation mode) as an operation mode of the browser engine, when it is determined that the CPU of the browser-installed-terminal supports the pre-set type of instruction set. Alternatively, the selecting unit 1202 is used to select an interpreter operation mode as an operation mode of the browser engine, when it is determined that the CPU of the browser-installed-terminal does not support the pre-set type of instruction set.

Referring back to FIG. 7, the operation module 103 can be configured to use the selected operation mode to run or operate the browser engine.

In specific embodiments, a pile function can be inserted into the JSC engine. When the JSC engine is in operation, the pile function in the JSC engine can modify the execution flow of the JSC engine to use the selected operation mode. The operation module 103 can use the selected operation mode to execute the program code to display page information in the browser. When the operation module 103 uses the selected operation mode to operate, the browser engine can execute the program code to display page information in the browser.

It should be noted that functions of various modules in the exemplary operating apparatus of the browser engine can be implemented according to the above disclosed methods.

As disclosed herein, according to the operating environment (including, for example, CPU environment of the browser-installed-terminal), a matched operation mode can be selected to operate the browser engine. In this manner, the browser can be operated in an operating environment in various types of terminals, i.e., the browser can be used in various terminal types. The flexibility for using a browser can be improved.

Various embodiments further include a browser. The browser can include the exemplary operating apparatus as depicted in FIG. 6-FIG. 8. Further, the disclosed browser can be used for implementing the methods as disclosed in FIGS. 1-5. Based on the operating apparatus of the browser engine, the browser can be operated in an operating environment of multiple types of terminals. That is, the browser can be used in various terminal types including smart/intelligent terminals and common terminals. The flexibility for using a browser can be improved.

Various embodiments further include a terminal. Exemplary browsers disclosed herein can be installed in such terminal and can include one or more operating apparatus as depicted in FIG. 6-FIG. 8. Further, the disclosed terminal can be used for implementing the methods as disclosed in FIGS. 1-5. Based on the operating apparatus of the browser engine, the browser can be operated in the operating environment of multiple types of terminals.

In various embodiments, the disclosed modules can be configured in one apparatus or configured in multiple apparatus as desired. The modules disclosed herein can be integrated in one module or in multiple modules. Each of the modules disclosed herein can be divided into one or more sub-modules, which can be recombined in any manner.

One of ordinary skill in the art would appreciate that suitable software and/or hardware (e.g., a universal hardware platform) may be included and used in the disclosed methods and systems. For example, the disclosed embodiments can be implemented by hardware only, which alternatively can be implemented by software products only. The software products can be stored in a computer-readable storage medium including, e.g., ROM/RAM, magnetic disk, optical disk, etc. The software products can include suitable commands to enable a terminal device (e.g., including a mobile phone, a personal computer, a server, or a network device, etc.) to implement the disclosed embodiments.

The embodiments disclosed herein are exemplary only. Other applications, advantages, alternations, modifications, or equivalents to the disclosed embodiments are obvious to those skilled in the art and are intended to be encompassed within the scope of the present disclosure.

INDUSTRIAL APPLICABILITY AND ADVANTAGEOUS EFFECTS

Without limiting the scope of any claim and/or the specification, examples of industrial applicability and certain advantageous effects of the disclosed embodiments are listed for illustrative purposes. Various alternations, modifications, or equivalents to the technical solutions of the disclosed embodiments can be obvious to those skilled in the art and can be included in this disclosure.

Various embodiments provide methods and apparatus for operating a browser engine, and related browsers and terminals. When starting a browser, an operating environment of the browser can be obtained. The operating environment can include a CPU environment in a browser-installed-terminal. A matched operation mode of the browser engine can be selected according to the operating environment. The selected operation mode can be used to operate the browser engine. Exemplary apparatus for operating the browser engine can include an obtaining module, a selection module, and an operation module. Various embodiments also provide a browser including the disclosed apparatus, and a terminal including the disclosed browser.

As disclosed herein, according to the operating environment (including, for example, a CPU environment of a browser-installed-terminal), a matched operation mode can be selected to operate the browser engine. In this manner, the browser can be operated in an operating environment in various types of terminals, i.e., the browser can be used in various terminal types. The flexibility for using a browser can be improved.

What is claimed is:

1. A method for operating a browser engine, the method comprising:
    obtaining an operating environment of a browser when starting the browser, including:
        obtaining a configuration file from a browser-installed-terminal;
        reading CPU (central processing unit) environment parameters from the configuration file of the browser-installed-terminal, wherein the CPU environment parameters comprise a type of instruction sets supported by a CPU of the browser-installed-terminal;
    according to the CPU environment parameters, determining if the CPU of the browser-installed-terminal supports a pre-set type of instruction sets, the pre-set type of instruction sets comprising a vfp (vector floating point) instruction set and a neon instruction set;
    when it is determined that the CPU of the browser-installed-terminal supports the pre-set type of instruction sets, selecting a JIT (just-in-time) operation mode as the operation mode of the browser engine;
    when it is determined that the CPU of the browser-installed-terminal does not support the pre-set type of instruction sets, selecting an interpreter operation mode as the operation mode of the browser engine; and
    using the selected operation mode to operate the browser engine.

2. The method of claim 1, wherein the pre-set type of instruction sets further comprises a vfpv3 (vector floating point v3) instruction set.

3. The method of claim 2, further comprising:
    when it is determined that the CPU of the browser-installed-terminal supports the vfpv3 instruction set, selecting the JIT operation mode as the operation mode of the browser engine; and
    when it is determined that the CPU of the browser-installed-terminal does not support the vfpv3 instruction set, selecting the interpreter operation mode as the operation mode of the browser engine.

4. The method of claim 2, further comprising:
    the pre-set type of instruction sets further comprises a vfpv2 instruction set, a vfpv1 instruction set, a SSE (streaming SIMD extensions) instruction set.

5. The method of claim 1, further comprising:
    when it is determined that the CPU of the browser-installed-terminal supports the vfpv3 instruction set and the neon instruction set simultaneously, selecting the JIT operation mode as the operation mode of the browser engine; and
    when it is determined that the CPU of the browser-installed-terminal does not simultaneously support the vfpv3 instruction set and the neon instruction set, selecting the interpreter operation mode as the operation mode of the browser engine.

6. The method of claim 1, wherein:
    the browser engine is a JS (Java Script) engine.

7. The method of claim 1, wherein:
    the browser-installed-terminal is an Android phone; and
    the configuration file is recorded in /proc/cpuinfo file of the Android phone.

8. An apparatus for operating a browser engine, the apparatus comprising:
    a hardware processor configured to execute:
    an obtaining module, configured to obtain an operating environment of a browser when starting the browser, including:
        obtaining a configuration file from a browser-installed-terminal;
        reading CPU (central processing unit) environment parameters from the configuration file of the browser-installed-terminal, wherein the CPU environment parameters comprise a type of instruction sets supported by a CPU of the browser-installed-terminal;
    a selection module, configured to:
        according to the CPU environment parameters, determine if the CPU of the browser-installed-terminal supports a pre-set type of instruction sets, the pre-set type of instruction sets comprising a vfp (vector floating point) instruction set and a neon instruction set;
        when it is determined that the CPU of the browser-installed-terminal supports the pre-set type of instruction sets, select a JIT (just-in-time) operation mode as the operation mode of the browser engine;
        when it is determined that the CPU of the browser-installed-terminal does not support the pre-set type of instruction sets, select an interpreter operation mode as the operation mode of the browser engine; and an operation module, configured to use the selected operation mode to operate the browser engine.

9. The apparatus of claim 8, wherein the pre-set type of instruction sets further comprises a vfpv3 (vector floating point v3) instruction set.

10. A browser user interface implemented with the apparatus of claim 8.

11. A terminal installed with the browser user interface of claim 10.

* * * * *